(12) United States Patent
Wrighton et al.

(10) Patent No.: US 10,127,151 B2
(45) Date of Patent: Nov. 13, 2018

(54) DYNAMICALLY SIZED LOCALS WITH PRECISE GARBAGE COLLECTION REPORTING

(71) Applicant: Microsoft Technology Licensing, LLC, Redmond, WA (US)

(72) Inventors: David C. Wrighton, Redmond, WA (US); Scott D. Mosier, Redmond, WA (US); Fadi M. Hanna, Bothell, WA (US); Peter F. Sollich, Munich (DE); Jan Kotas, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 15/153,755

(22) Filed: May 13, 2016

(65) Prior Publication Data
US 2017/0329704 A1 Nov. 16, 2017

(51) Int. Cl.
*G06F 12/02* (2006.01)
*G06F 8/41* (2018.01)
*G06F 9/445* (2018.01)

(52) U.S. Cl.
CPC ............ *G06F 12/0253* (2013.01); *G06F 8/41* (2013.01); *G06F 9/44563* (2013.01); *G06F 12/0223* (2013.01); *G06F 12/0238* (2013.01); *G06F 2212/1044* (2013.01)

(58) Field of Classification Search
CPC ................... G06F 12/0253–12/0276
See application file for complete search history.

(56) References Cited

U.S. PATENT DOCUMENTS

| 5,903,899 | A | * | 5/1999 | Steele, Jr. | ........... G06F 12/0253 |
| 5,909,579 | A | * | 6/1999 | Agesen | ............... G06F 12/0253 |
| | | | | | 707/999.202 |
| 6,081,665 | A | * | 6/2000 | Nilsen | ................. G06F 9/45504 |
| | | | | | 711/E12.011 |
| 6,101,580 | A | * | 8/2000 | Agesen | ................. G06F 9/5016 |
| | | | | | 707/999.202 |
| 6,381,738 | B1 | * | 4/2002 | Choi | ....................... G06F 8/443 |
| | | | | | 711/E12.006 |
| 7,035,884 | B2 | | 4/2006 | Garthwaite | |
| 7,149,870 | B2 | | 12/2006 | Blandy | |
| 7,596,667 | B1 | | 9/2009 | Detlefs et al. | |
| 8,375,373 | B2 | | 2/2013 | Sollich | |

(Continued)

OTHER PUBLICATIONS

Agesen, et al., "Garbage Collection and Local Variable Type-Precision and Liveness in JavaTM Virtual Machines", In Proceedings of ACM SIGPLAN Conference on Programming Language Design and Implementation, Jun. 17, 1998, pp. 269-279.

(Continued)

*Primary Examiner* — Edward J Dudek, Jr.
*Assistant Examiner* — Andrew Russell (57) ABSTRACT

An instance of universally shared generic code is generated. A runtime parameter enables the size of a stack frame on which local data can be stored to be determined. Dynamically sized locals can be stored on a stack enabling precise garbage collection reporting. One frame of the stack is allocated for each code segment to simplify GC reporting. A reporting region in the frame memory region comprises a count of locals and a location at which the local is found in the stack.

19 Claims, 6 Drawing Sheets

(56) References Cited

U.S. PATENT DOCUMENTS

| | | | |
|---|---|---|---|
| 8,776,032 B2 | 7/2014 | Hawblitzel | |
| 2003/0126590 A1* | 7/2003 | Burrows | G06F 9/30192 717/154 |
| 2011/0258615 A1 | 10/2011 | Sollich | |
| 2015/0331681 A1* | 11/2015 | Rose | G06F 8/437 717/143 |

OTHER PUBLICATIONS

Ganesan, Ravichandran, "Local Variable Allocation for Accurate Garbage Collection of C++", In Technical Report TR94-12, Nov. 8, 1994, 26 pages.

"Limitations", Published on: May 11, 2015. Available at: https://developer.xamarin.com/guides/ios/advanced_topics/limitations/offline.pdf.

"International Search Report and Written Opinion Issued in PCT Application No. PCT/US2017/031629", dated Jul. 6, 2017, 17 Pages.

* cited by examiner

DYNAMICALLY SIZED LOCALS WITH PRECISE GARBAGE COLLECTION REPORTING

BACKGROUND

In the realm of computer science, garbage collection (GC) is a form of automatic memory management in which a garbage collector finds and reclaims memory occupied by data that is no longer in use by an executing program. Garbage collection can consume a significant proportion of processing resources and thus can have a significant impact on performance. The advantages of garbage collection include but are not limited to the following. The programmer does not have to explicitly de-allocate memory, thereby eliminating or substantially reducing the types of programming bugs associated with these activities.

In addition, with GC, certain types of memory leaks can be avoided. A memory leak occurs, for example, when the memory occupied by unreachable objects becomes unusable. However, because the garbage collector determines which memory to free, overhead is incurred, which can lead to decreased or uneven performance. Additional memory is often needed to compensate for the GC overhead in order for the program to be able to perform as fast as when explicit memory management is performed. Pauses in program execution may occur at the time at which the garbage is actually collected. These pauses may be unacceptable when performing certain tasks.

SUMMARY

Memory space for local data can be dynamically allocated on a stack instead of on the GC heap so that precise information about when the data can be garbage collected and where the data is located can be reported to the garbage collector. Precise GC means retaining only those items on the GC heap that will actually be used in the future. Precise GC reporting means that the garbage collector is explicitly told when and where in memory local data can be garbage collected. Code generation and the runtime behavior of universally shared generic code can enable precise GC reporting and can increase the performance of an application.

Instead of allocating memory for local data on the GC heap, local data can be stored on the stack. Additional information about the local data can also be stored on the stack so that a process such as but not limited to a GC reporting process, can accurately perform GC reporting. Each code segment (e.g., function, method or subroutine, etc.) in a program can be assigned its own frame on the stack (one frame for each code segment). The size of the frame allocated on the stack can vary based on a dynamically-determined type description associated with the data. Generic source code can be compiled into a single instance of universally shared generic code whose behavior at runtime is dependent on a generic context parameter received at runtime. The single instance of universally shared generic code can be used for all possible instantiations of the generic code. Universally shared generic code can be generated at compile time, eliminating the need for JIT-compilation at runtime. A parameter (e.g., a generic context parameter) specified at runtime can be used to affect the behavior of the single instance of universally shared generic executable code. When executed, the universally shared generic executable code can dynamically determine the size of the stack frame needed for the local data, allocate the stack frame, store local data on the stack and store a description of the local data so that a subsequent process can perform precise GC reporting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

When developing applications in some programming languages such as but not limited to C#, Swift, Rust and Java, it is possible to write generic code that can take different type parameters at compile time. The executable code that is generated for different instantiations of a particular piece of generic code can be different depending on what type parameter is provided to the generic code. However, if type parameters are similar in their data representations, it is possible to share code between multiple instantiations of the code having similar data representations.

Some implementations of generic code sharing are limited to reference type instantiations. Examples of reference type instantiations in the programming language C#, for example, are code that adds a string item to a list of strings and code that adds a string item to a list of strings at a node. Both "string" and "node" are "reference types", that is, when stored into local variables of a function, the actual data stored into the local variable is a reference to a location in memory where the value is stored instead of the actual value. That is, for example, a reference to an object's contents is stored into the local memory as a pointer instead of copying the contents (the value) of the object into the local variable. Similarities in code such as this can be taken advantage of through the generation and use of generic code that can be shared. That is, the same code can be used over and over again to produce different results based on different parameters passed to the generic code during compile time. Generic code sharing can make the size of executables (e.g., native machine code) smaller and can make servicing (updating) the code easier because only the program module in which the generic code is located has to be changed.

When the same piece of shared generic code can be used for all possible data types, the code is called "universally shared generic code". Universally shared generic code is "universally" sharable for all instantiations of the generic code. The universally shared generic code sharing described herein applies to all instantiations of the generic code, including but not limited to value type instantiations. When code is compiled into machine readable code segments, the way that temporary data (also called "local variables" or just "locals") is defined in the source code has to be kept track of. The type of temporary data (such as but not limited to variables or objects) can vary based on the parameter or parameters the universally shared generic code receives at runtime. One factor in sharing code between all instantiations is dealing with different sizes of value types. Another factor pertains to how easily the memory which is relevant to the GC can be identified. Another relevant factor is runtime performance. The subject matter described herein addresses at least these factors.

Sharing code can impact runtime performance. In some situations, it is not desirable to run a just-in-time (JIT) compiler at application runtime because of performance issues, etc. A just-in-time compiler generates platform-specific or machine-specific executable code dynamically (while a program is executing). Production of a "universally shared generic" version of generic code can eliminate the need for JIT compilation. The universally shared generic code removes the need for JIT compilation because a runtime parameter can be dynamically generated instead of having to be known at compile time. While it is possible to know some of the possible values for the runtime parameter at compile time, knowledge of the values for the complete set of possible runtime parameters is not required when using universally shared generic code. In some cases, the universally shared generic code may take an extra "generic context" parameter at runtime. The generic context parameter can dynamically determine how the single instance of the universally shared generic executable code behaves in this particular execution of the universally shared generic executable.

In accordance with some aspects of the subject matter described herein, for dynamically created generic types, the field layout and instance size can be computed at runtime from pre-processed metadata (e.g., metadata processed at compile-time) associated with native layout using the same algorithm used by the static compiler. If the field layout is affected by the type of the parameter or parameters provided to the universally shared generic executable code, the universally shared generic executable code accessing the fields can compute the offset of affected fields via a dictionary lookup. In some cases the type of the runtime generic context parameter will not affect field layout.

The use of universal shared generic code can account for differences in behavior that result because different parameters can be supplied at runtime. A non-limiting example is the size of the values of the generic context parameter type. For example, a "double" may need 8 bytes of data storage while a Boolean or "bool" may only need 1 byte. If local data comprises variables whose type involves the generic context parameter type, the local variables can vary in size depending on which particular type is being substituted for the generic context parameter(s). This explains why generic code sharing for reference types is a straightforward task. Reference types are pointers. All pointers are the same size, irrespective of the data type referenced. As a result, the stack frame size for such shared generic code can be fixed at compile time, even when some locals are of types dependent on a generic context parameter. A stack frame is the region of the stack reserved by a particular activation of a particular code segment for its exclusive use, usually for storing local data such as variables or objects. A stack is an abstract data type that holds a collection of data elements. One stack operation is a push, which adds an element to the collection, and another is pop, which removes the most recently added element still on the stack. The order in which elements come off a stack is called LIFO (last in, first out).

Known implementations of generic code rely on allocating independent objects on the GC heap for all local data that is of variable size. This approach keeps the stack frame size fixed at compile time for a code segment, which simplifies stack layout. By being fixed at compile time, the runtime size is also fixed and cannot vary based on the type parameters. Allocating space for locals on the GC heap typically increases the use of processing resources because, for example, the GC has to determine that the objects or variables allocated (to contain the local variables' values) are no longer referenced before the space can be reclaimed, artificially extending the lifetime of these values (which only stay alive as long as the function or subroutine to which they belong is executing). An approach which allocates them on the stack using a variable-size stack allocation has the advantage of allowing removal of the values when the code segment completes, decreasing the amount of work the GC has to do and using memory more efficiently.

In accordance with aspects of the subject matter described herein, code generation mechanisms can produce at compile time a single universally shared piece of generic executable code that when executed at runtime can allocate space on the stack for local data associated with the particular instantiation of the universally shared generic code. The size of the local data can vary and therefore the size of the stack frame that is allocated at runtime can vary accordingly. The amount of space on the stack that is needed at runtime to store local data cannot be determined at compile time if the size of the local data is affected by the generic context (type) parameter received at runtime. In this case, a memory block of an appropriate size can be allocated at runtime and the block can be identified as being relevant to the GC. In accordance with some aspects of the subject matter described herein, a code generator, which may operate in background, can generate code for allocation of a variable-sized region on the stack at runtime. The code generator can determine the size of the function's local variables based on the generic context parameter. The generic context parameter is data that describes to the code generator details of the current instantiation of the generic code.

Additionally, information can be stored in the stack frame that describes the location and particular type of each stack-allocated local in order to allow the GC to efficiently and correctly determine where any object references are located in this variably-sized (and variably-typed) region of stack. The information can be communicated via instructions such as but not limited to pseudo-ops or by any other suitable mechanism.

Dynamically Sized Locals with Precise Garbage Collection Reporting

Figure 1A:
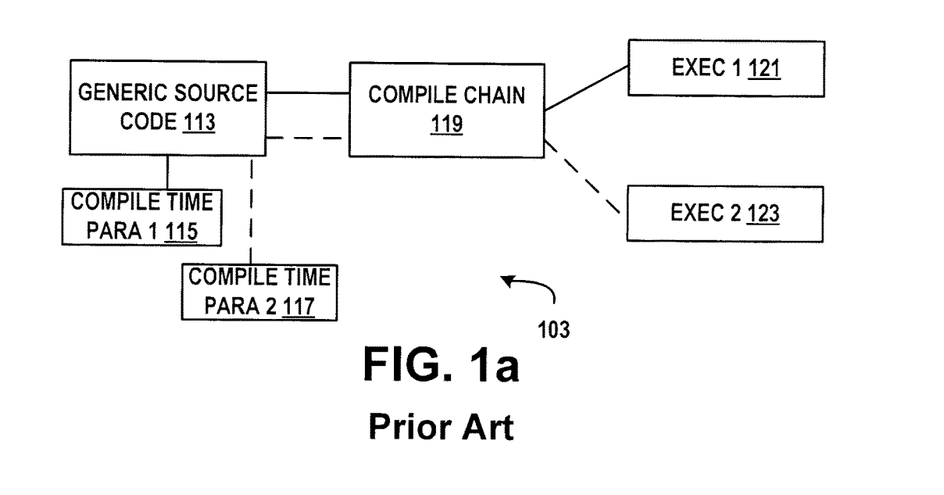
FIG. 1a is a block diagram 103 representing generic code sharing at compile time as is known in the art.

FIG. 1a is a block diagram 103 representing generic code sharing at compile time as is known in the art. In FIG. 1a generic source code such as generic source code 113 and a first compile time parameter such as compile time parameter 1 115 can be received by a compile chain such as compile chain 119. A first executable such as executable 1 121 can be generated. For example, as described more fully above, the first compile time parameter may be a parameter that indicates that the executable that is produced (e.g., executable 1 121) will add a string to a list of strings. Similarly, generic source code 113 and a second compile time parameter such as compile time parameter 2 117 can be received by the compile chain 119 and a second executable such as executable 2 123 can be generated. The second compile time parameter may be a parameter such as compile time parameter 2 117 that indicates that the executable to be generated will add a string to a list of strings at a node, as described more fully above. It will be appreciated that although the same generic source code is used, different instantiations of the code can be produced, the different instantiations being different (e.g., executable 1 121 and executable 2 123 are not identical: one adds a string to a list of strings and one adds a string to a list of strings at a node). That is, the first executable, executable 1 121 is different than the second executable, executable 2 123 although the code from which the executables were generated is the same (generic).

Executable 1 121 and executable 2 123 are examples of reference type instantiations. Both "string" and "node" are "reference types", that is, when the executable executes, the actual data stored in a local variable stored on the stack is a reference or pointer to a location in memory where the value is stored instead of the actual value being stored in the local variable. Because all pointers are the same size, the size of the stack needed to store the local variables can be calculated at compile time.

Figure 1B:
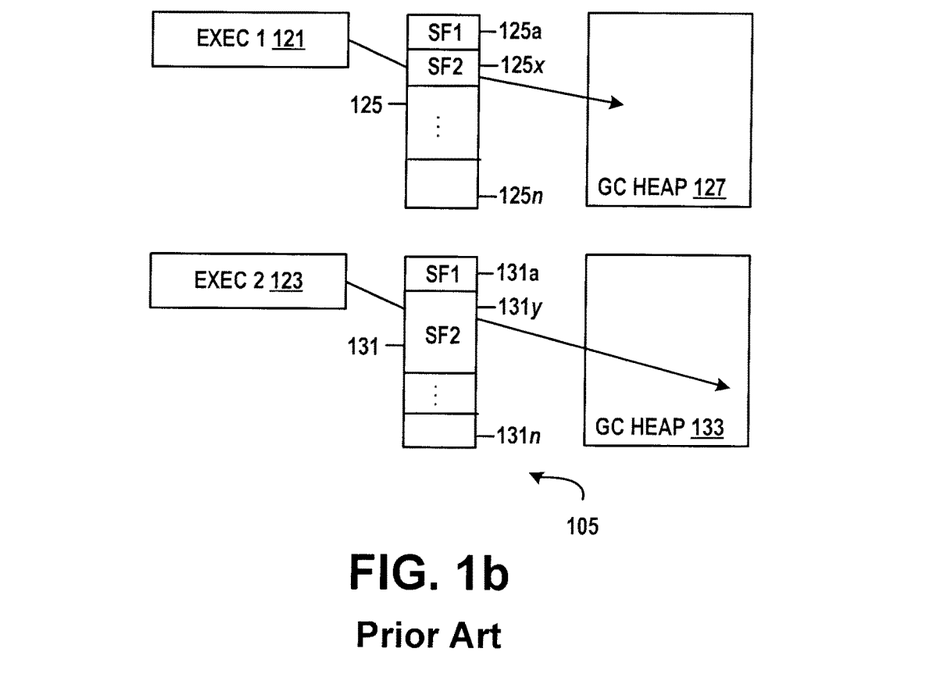
FIG. 1b is a block diagram 105 representing generic code sharing at run time as is known in the art.

FIG. 1b is a block diagram 105 representing the execution of the executables generated in FIG. 1a. Each time generic source code 113 and compile time parameter 1 115 are compiled, the stack frame size calculation will yield the same result (e.g., a stack frame size of x). Each time generic source code 113 and compile time parameter 2 117 are compiled, the stack frame size calculation will yield the same result (e.g., a stack frame size of y), where x is not necessarily the same as y. In FIG. 1b each time executable 1 121 is executed, a stack such as stack 125 including stack frames such as stack frame 1 to n (e.g., stack frame 125a . . . stack frame 125n. For each function, etc. in executable 1 121, a fixed size frame of size x, such as, for example, stack frame 125x on the stack 125 can be allocated, where the entries in the stack frame for executable 1 121 point to locations (e.g., objects) in a GC heap such as GC heap 127. Similarly, each time executable 2 123 is executed, a stack such as stack 131 including stack frames such as stack frame 1 to stack frame n (e.g., stack frame 131a . . . stack frame 131n. For each function, etc. in executable 2 123, a fixed size frame of size y, such as, for example, stack frame 131y on the stack 131 can be allocated, where the entries in the stack frame for executable 2 123 point to locations (e.g., objects) in a GC heap such as GC heap 133. It will be appreciated that the stack frame(s) associated with executable 1 121 can be anywhere on stack 125. Similarly, the stack frame(s) associated with executable 2 123 can be anywhere on stack 131.

Figure 1C:
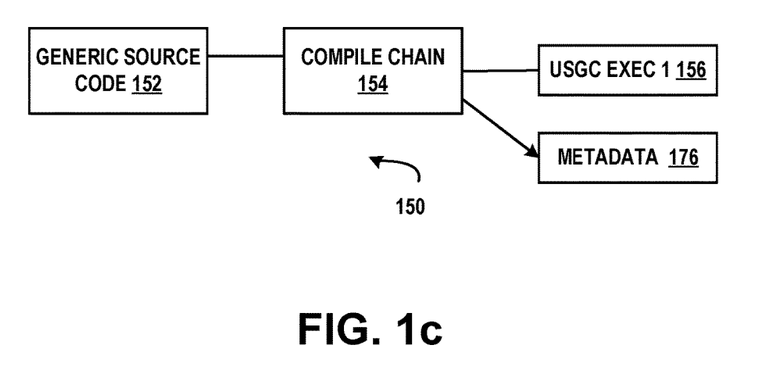
FIG. 1c is a block diagram 150 representing an example of universally shared generic code sharing at compile time for precise garbage collection reporting in accordance with aspects of the subject matter described herein.

FIG. 1c is a block diagram 150 representing an example of generation at compile time of universally shared generic code for precise garbage collection reporting in accordance with aspects of the subject matter described herein. In FIG. 1c generic source code such as generic source code 152 can be received by a compile chain such as compile chain 154. In accordance with some aspects of the subject matter described herein, no type parameter is provided to the compile chain 154 for the generic source code 152. Metadata such as metadata 176 can be generated. A single executable such as executable 156 can be generated. Universally shared executable 156 can be used for all possible instantiations of the corresponding generic source code as described above. That is, universally shared generic executable 156 is an example of universally shared generic code. It will be appreciated that an indication of the desire to produce universally shared generic code may be provided to the compile chain 154. The lack of a type parameter may be such an indication.

Figure 1D:
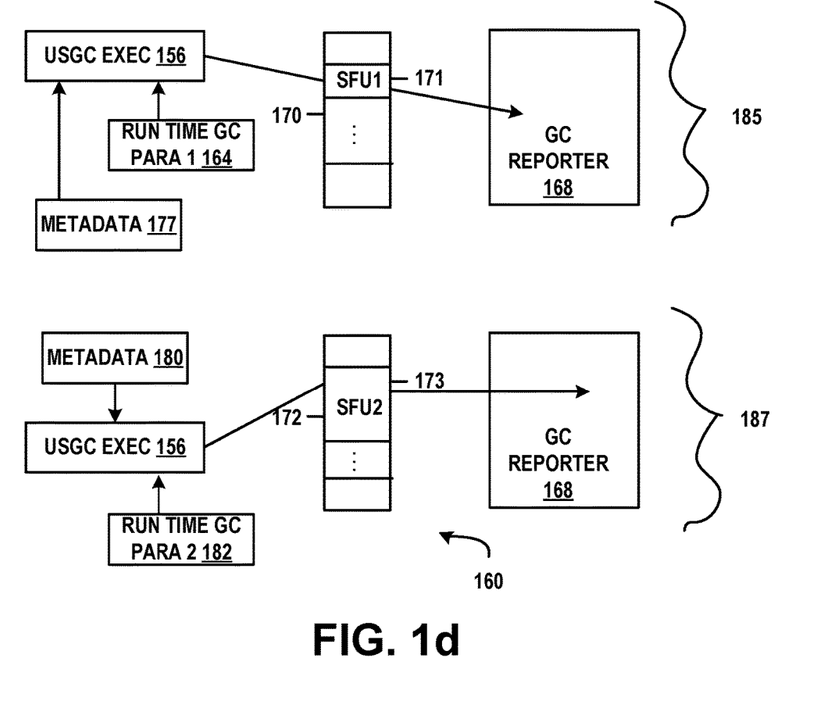
FIG. 1d is a block diagram 160 representing an example of universally shared generic code sharing at runtime for precise garbage collection reporting in accordance with aspects of the subject matter described herein.

FIG. 1d is a block diagram 160 representing an example of the execution of the universally shared generic code for precise garbage collection reporting for the universally shared generic code executable generated in FIG. 1c in accordance with aspects of the subject matter described herein. In FIG. 1d the same instance of universally shared generic code, universally shared generic code 156 is executed. In a first execution such as execution 185, universally shared generic code 156 can receive a runtime generic context parameter such as runtime GC parameter 1 164. Metadata associated with the universally shared generic code 156 such as metadata 177 can be accessed by universally shared generic code 156. From this information, the size of the stack frame needed to store local variables can be dynamically determined. Universally shared generic code 156 can allocate the stack frame SFU1 171 for a code segment on a stack 170, and can store the local data and information describing the local data that enables precise GC reporting by a GC reporter 168 on stack frame SFU1 171. Universally shared generic code 156 can provide this information to the GC reporter 168.

In another execution, execution 2 187, the same instance of universally shared generic code 156 may receive a different runtime generic context parameter such as such as runtime GC parameter 2 182. Metadata such as metadata 180 can be accessed by universally shared generic code 156. From the metadata 180 and the runtime GC parameter 2 182, the size of the stack frame needed to store local variables for universally shared generic code 156 can be dynamically determined. Alternatively, (not shown), a particularized instance of universally shared generic code can be generated by a background compiler (not shown) and the particularized instance can be used to allocate and store the local data and reporting information on the stack. The same instance of universally shared generic code 156 can allocate the stack frame SFU2 173 for a code segment, and can store the local data and information describing the local data that enables precise GC reporting by a GC reporter 168 on stack frame SFU2 173 on stack 172. It will be appreciated that the size of the stack frame generated for execution 1 185 can be different than the size of the stack frame generated for execution 2 187 because the size of the stack frame generated for execution 1 185 is based on the runtime generic context parameter 1 164 and the size of the stack frame generated for execution 2 187 is based on the runtime generic context parameter 2 182. Because generic context parameter 2 182 can be different than runtime generic context parameter 1 164 the size of the stack frames SFU1

171 and SFU2 173 can be different. In other words, the same instance of universally shared generic code can behave differently at runtime in different executions because the runtime generic context parameters provided are different.

Figure 1E:
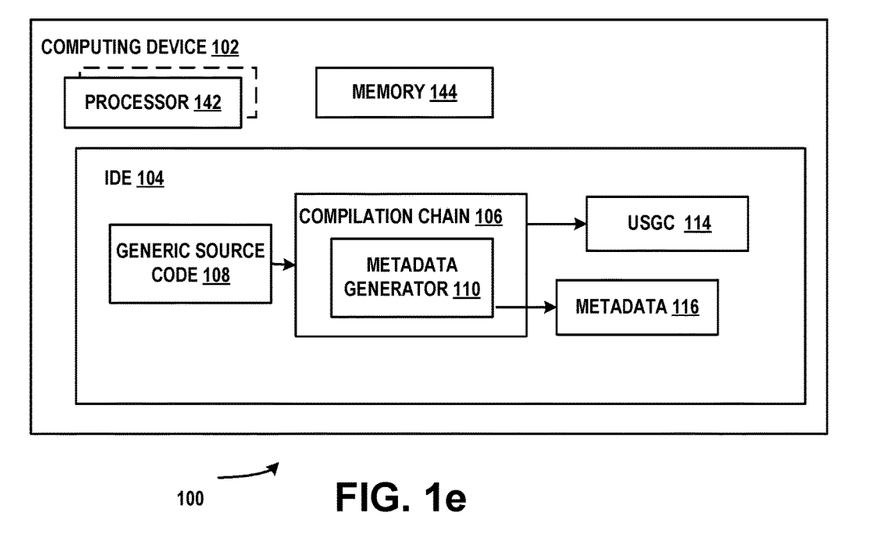
FIG. 1e is a block diagram 100 representing an example of a compile time system for precise garbage collection reporting in accordance with aspects of the subject matter described herein.

FIG. 1e is a block diagram representing a compile time system 100 for precise garbage collection reporting in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 may execute wholly or partially within an IDE such as IDE 104 or can execute wholly or partially outside an IDE. An IDE can be an IDE such as the one described with respect to FIG. 4 or can be any other IDE. All or portions of system 100 may be implemented as a plug-in or add-on.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102 can include one or more processors such as processor 142, etc., and a memory such as memory 144 that communicates with the one or more processors.

System 100 may include any one of or any combination of program modules comprising: a compilation chain such as compilation chain 106, and/or a metadata generator such as metadata generator 110. The metadata generator can be within the compilation chain or can be outside the compilation chain (not shown). Compilation chain 106 may receive generic source code such as generic source code 108 and may generate universally shared generic executable 114. At compile time the generic source code such as generic source code 108 can be received by a compilation chain such as compilation chain 106. A compilation chain 106 may include or be associated with a metadata generator such as metadata generator 110. A single executable such as universally shared generic executable 114 can be generated. The generated executable can be used for all instantiations of the generic source code. Metadata such as metadata 116 can also be generated. In accordance with some aspects of the subject matter described herein, the metadata that is produced for the generated executable can be the same. In accordance with some aspects of the subject matter described herein, the metadata that is produced for the generated executable can differ based on the particular compilation environment. Metadata 116 can include information including but not limited to information that can be used to translate from the generic context parameter received at runtime into how much memory to allocate at runtime for the stack frame. The metadata can include information about the universally shared generic executable code generated at compile time.

In accordance with some aspects of the subject matter described herein, (not shown) a binder may receive code and parameter(s) and may generate an executable and metadata.

A binder can bind files together into a single element. A binder can receive intermediate code or machine code and can refine the machine code or intermediate code by, for example, using instructions such as pseudo-ops. An instruction can request a downstream processor to generate machine code. An instruction can keep track of what machine code was generated and can create metadata in a particular format, such as for example in a native layout. Examples of pseudo-ops that may be received by a binder can include but are not limited to the following:

HAS_ALLOCA_BASED_ALLOC_LOCALS *GenericsContext*

This is an instruction that is placed in the prolog of a function to indicate that space on the stack is to be allocated for local data. This pseudo op generates a pointer sized region in a stack frame and can include enhanced reporting behavior that enables precise GC reporting.

GET_ALLOCA_BASED_ALLOC_LOCAL_SIZE (register)

This is an instruction that can place into a register the number of bytes required to be allocated onto the stack to store the locals for this code segment.

INITIALIZE_ALLOCA_BASED_ALLOC_LOCALS (rcx, ecx, r0) *GenericsContext*

This is an instruction that can initialize the memory allocated for the local data. This instruction can receive a pointer to the allocated memory, and can receive a generic context parameter. It can return the initialized memory in registers such as but not limited to, for example, registers such as rax, eax, and r0. This instruction may clear registers such as, for example, those that store information associated with a call. Additionally, it can store pointers to allocated locals in a reporting region for precise GC reporting. It can fill the allocated space with a header. A header can include a series of pointers to various allocated objects, and/or pointers to local regions. The first pointer sized region can include the count of locals (how many local variables are stored on the stack). Each individual local can be allocated with its type as a prefix. Implementation can be via a helper call+mov instruction immediately following the helper call.

ALLOCA_ALLOC_LOCAL <reg1><reg2><type token>

This is an instruction that can allocate space for a local variable, token, having a data type of type, on the stack. This instruction can receive a pointer to the initialized locals memory in a register such as, for example, reg1 (as produced by the INITIALIZE_ALLOCA_BASED_ALLOC_LOCALS instruction, and can set another register such as for example, register 2 to contain a pointer to the local. In accordance with some aspects of the subject matter described herein, the second register (e.g., register 2) can be modified by the instruction. The instruction can return the same result even if it is used in a loop. In accordance with some aspects of the subject matter described herein, a generics context parameter is not taken as input.

The general use pattern expected follows.

. . .

HAS_ALLOCA_BASED_ALLOC_LOCALS

. . .

ENDPROLOG

. . .

GENERICS_CONTEXT rsi, GENERIC_DICT
GET_ALLOCA_BASED_ALLOC_LOCAL_SIZE rax
rcx=Alloca(rax)
GENERICS_CONTEXT rsi, GENERIC_DICT
INITIALIZE_ALLOCA_BASED_ALLOC_LOCALS
ALLOCA_ALLOC_LOCAL rax, rcx T
Mov [ebp+xxx], rcx ALLOCA_ALLOC_LOCAL rax, rcx MyStruct<T>
Mov [ebp+xxx], rcx The binder needs various information to be able to set up the code for the stack frame of a method that uses this technique so before the end of the function prolog, the CODE can encode a flag (HAS_ALLOCA_BASED_ALLOC_LOCALS). After completion of the prolog, the code can generate the logic necessary to allocate the variable sized area on the stack frame. This is done by getting the total variable size of the frame via the GET_ALLOCA_BASED_ALLOC_LOCAL_SIZE instruction. Once the variable sized area is allocated, it can be initialized via the INITIALIZE_ALLOCA_BASED_ALLOC_LOCALS instruction. Once that instruction is complete, the GC reporting for the variable region will be functional. Finally, to get access to the allocated memory for a specific local, it can be accessed via ALLOCA_ALLOC_LOCAL. That instruction will provide access to the memory for a specific local. Unlike GET_ALLOCA_BASED_ALLOC_LOCAL_SIZE and INITIALIZE_ALLOC_LOCAL. There may be multiple ALLOCA_ALLOC_LOCAL instructions.

Figure 1F:
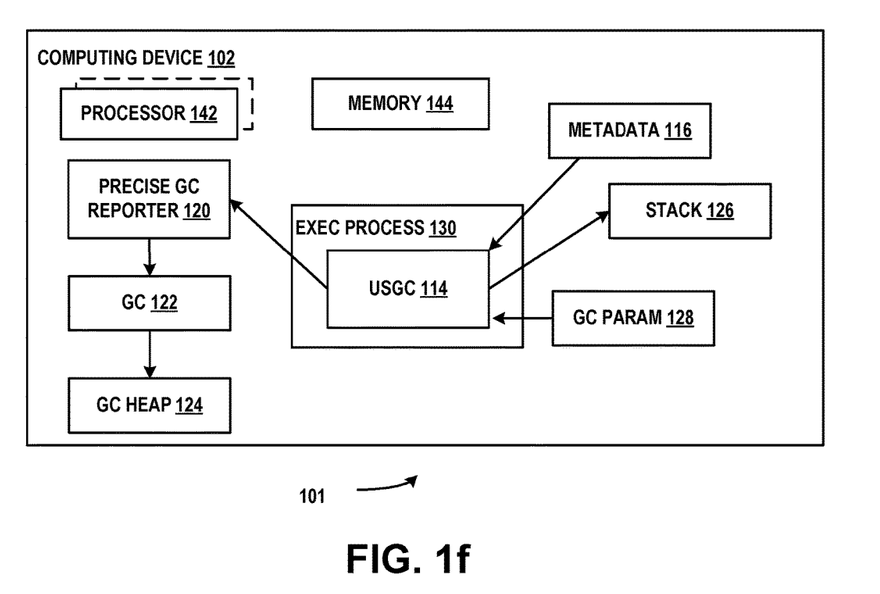
FIG. 1f is a block diagram 101 representing an example of a runtime system for precise garbage collection reporting in accordance with aspects of the subject matter described herein.

FIG. 1f is a block diagram representing a runtime system 101 for precise garbage collection reporting in accordance with aspects of the subject matter described herein. All or portions of system 101 may reside on one or more computers or computing devices such as the computers described below with respect to FIG. 3. System 101 or portions thereof may be provided as a stand-alone system or as a plug-in or add-in. System 101 may execute wholly or partially within an IDE or can execute wholly or partially outside an IDE. An IDE can be an IDE such as the one described with respect to FIG. 4 or can be any other IDE. All or portions of system 101 may be implemented as a plug-in or add-on.

System 101 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 101 can include one or more computing devices such as, for example, computing device 102. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102 can include one or more processors such as processor 142, etc., and a memory such as memory 144 that communicates with the one or more processors.

System 101 may include any one of or any combination of program modules comprising one or more of: a precise GC reporter such as precise GC reporter 120, a GC such as GC 122, a GC heap such as GC heap 124, a stack such as stack 126, an executing process such as executing process 130, universally shared generic code such as the universally shared generic code 114 generated in FIG. 1e executing in executing process 130, and/or a generics context parameter(s) 128. In operation universally shared generic executable code such as universally shared generic executable code 114 and metadata 116 can be loaded into a process 130. A runtime generic context parameter such as generic context parameter 128 can be provided to the universally shared generic code 114. The runtime generic context parameter can provide information that enables the universally shared generic code 114 to dynamically calculate the size of a stack frame to allocate on the stack such as stack 126 and to allocate a stack frame of the calculated size (one frame per code segment). Information can be stored on the stack that enables a precise GC reporter such as precise GC reporter to report to the GC such as GC 122, regions of the stack that can be garbage collected.

For example, suppose a variable of type T is to be stored on the stack. Space for the variable of type T can be allocated on the stack. When type T is a reference type, a pointer to the location of the variable can be dynamically reported to the precise GC reporter. If type T is a structure, having at least one reference type field within it, the reference type field or fields can be reported.

Figure 2A:
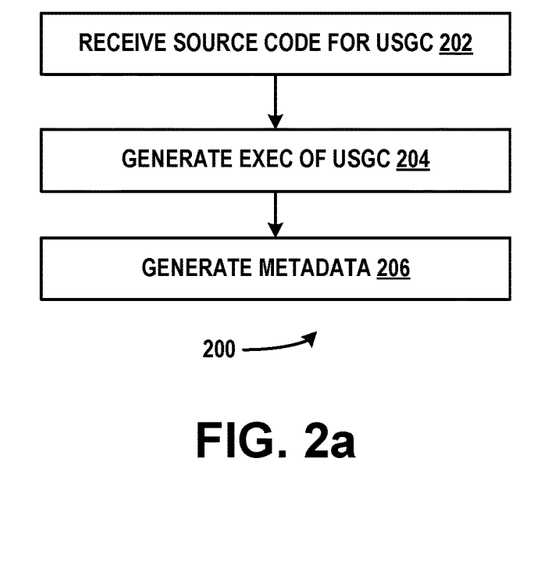
FIG. 2a illustrates an example 200 of a compile time method for precise garbage collection reporting in accordance with aspects of the subject matter described herein.

FIG. 2a illustrates an example of a method 200 for precise garbage collection reporting in accordance with aspects of the subject matter described herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100 and/or system 101.

At operation 202 generic source code can be received by a compilation chain. At operation 204 an executable comprising universally shared generic code can be generated. At operation 206 metadata can be generated. The metadata can include information that can be used to translate from the generic context type parameter received at runtime into how much memory to allocate at runtime for the stack frame. The metadata can include information about the universally shared generic executable code generated at operation 204.

Figure 2B:
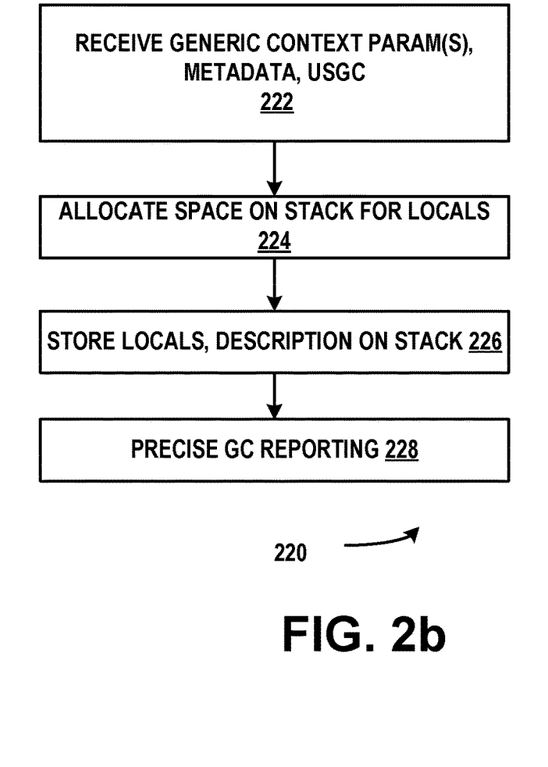
FIG. 2b illustrates an example 220 of a runtime method for precise garbage collection reporting in accordance with aspects of the subject matter described herein.

FIG. 2b illustrates an example of a runtime method 220 for precise garbage collection reporting in accordance with aspects of the subject matter described herein. While method 220 describes a series of operations that are performed in a sequence, it is to be understood that method 220 is not limited by the order of the sequence depicted. For instance, some operations may occur in a different order than that described. In addition, one operation may occur concurrently with another operation. In some instances, not all operations described are performed. In some instances, not all operations performed are illustrated. Method 220 or portions thereof may be executed by a system or a portion of a system such as system 100 and/or system 101. At operation 222 a generic context parameter or set of parameters and metadata, and the single instance of universally shared generic code that works for all possible instantiations of the corresponding generic code can be received. Calculations such as the size of the stack to be allocated, etc. can be made. At operation 224 space on a stack can be generated in accordance with the received parameter or parameters. At operation 226 local data can be stored on the stack. A description of the local data can be stored on the stack. At operation 228 precise GC reporting information can be provided to a subsequent (GC reporting process).

Described herein is a computing device that comprises at least one processor, a memory connected to the at least one processor and at least one program module that when loaded into the memory causes the at least one processor to: execute a single instance of universally shared generic code that works for all instantiations of corresponding generic source code to allocate space on a stack for local data, store local data on the stack, wherein the local data is variably sized, store a description of the stored local data on the stack and provide precise GC reporting information to a subsequent process. In addition one or more program modules may dynamically determine size of a stack frame to allocate for local data based on at least one generic context parameter comprising a type description associated with the local data. In addition one or more program modules may receive the at least one generic context parameter at runtime. In addition one or more program modules may receive the at least one generic context parameter at runtime from which a size of the stack frame to be created is determined. In addition one or more program modules may allocate local data on the stack using a variably-sized stack allocation. In addition one or more program modules may tell a subsequent process where the local data for garbage collection can be found. In addition one or more program modules may allocate space on the stack for local data associated with a particular execution of the universally shared generic code. The size of the space allocated stack frame varies in accordance with size of the local data. Described herein is a method of performing precise GC reporting comprising: receiving by a processor of a computing device at runtime universally shared generic code and a generic context parameter and generating an instance of universally shared generic code comprising machine code based on the generic context parameter, the instance-specific machine code storing local data on a stack during runtime instead of on a GC heap. The size of the stack may be determined based on a type description. A generic context parameter comprising a type description for local data to be stored on the stack may be received. A generic context parameter at runtime from which stack size is dynamically determined may be received. Described herein is computing device comprising at least one processor, a memory connected to the at least one processor and at least one program module that when loaded into the memory causes the at least one processor to receive generic source code, generate universally shared generic code and generate metadata for the universally shared generic code. In addition one or more program modules receive universally shared generic code, wherein a particular instance of the universally shared generic code at runtime calculates a size of a stack based on size of local data stored on the stack. In addition one or more program modules may at runtime keep track of where a particular piece of local data is stored on the stack. In addition one or more program modules may tell a garbage collector when the local data can be garbage collected. In addition one or more program modules may tell the garbage collector where on the stack the local data that can be garbage collected can be found. In addition one or more program modules assign each code segment its own frame on the stack. The stack may include a GC reporting area. The universally shared generic code may be generated in response to receiving no parameter at compile time.

Example of a Suitable Computing Environment

Figure 3:
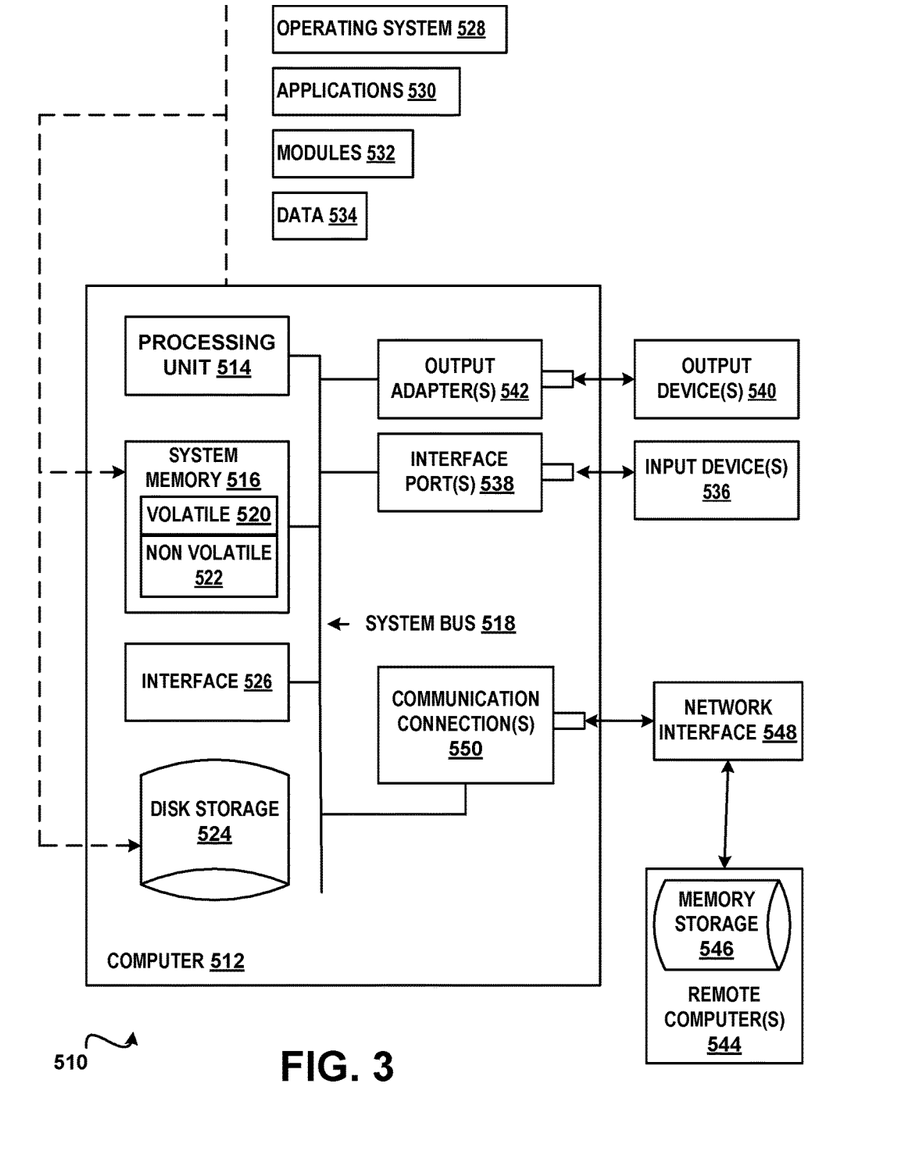
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
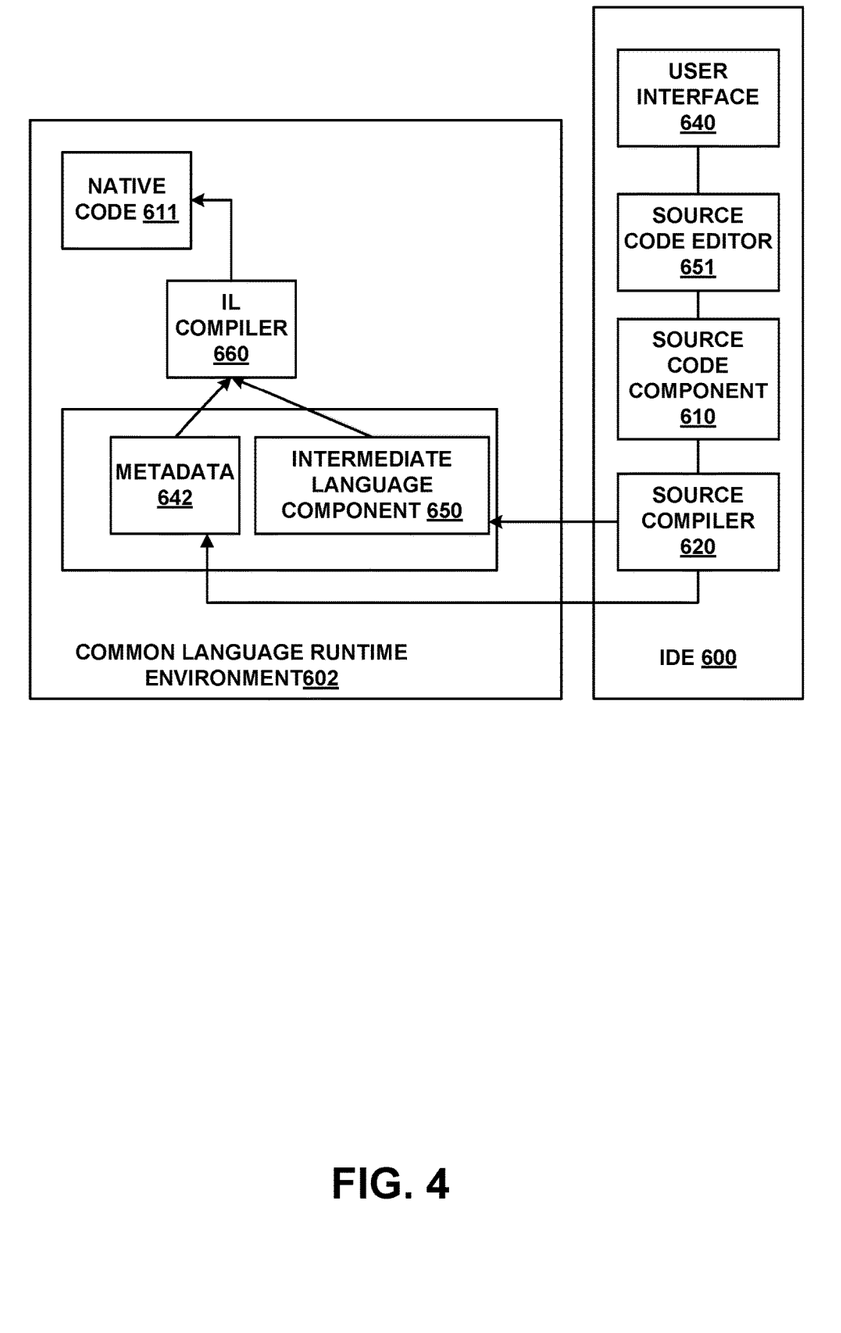
FIG. 4 is a block diagram of an example of an integrated development environment in accordance with aspects of the subject matter described herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device comprising:
    at least one processor; and
    a memory connected to the at least one processor;
    wherein the at least one processor is configured to:
        execute a single instance of universally shared generic code that works for all data types of variables and/or objects in each instantiation of corresponding generic source code by performing actions to:
        allocate space on a stack, instead of a garbage collection heap, for local data;
        store local data on the stack, wherein the local data is variably sized;
        store a description of the stored local data on the stack; and
        provide precise garbage collection (GC) reporting information to a subsequent process, wherein the precise GC reporting information indicates precisely where in the stack the local data is to be reclaimed.

2. The computing device of claim 1, further comprising:
    at least one program module that:
        dynamically determines size of a stack frame to allocate for the local data based on at least one generic context parameter comprising a type description associated with the local data.

3. The computing device of claim 2, wherein the at least one processor is further configured to:
    receive the at least one generic context parameter at runtime.

4. The computing device of claim 1, wherein the at least one processor is further configured to:
    receive the at least one generic context parameter at runtime from which a size of the stack frame to be created is determined.

5. The computing device of claim 1, wherein the at least one processor is configured to:
    tell a subsequent process where the local data for garbage collection can be found.

6. The computing device of claim 1, wherein the at least one processor is further configured to:
    allocate space on the stack for local data associated with a particular execution of the universally shared generic code.

7. The computing device of claim 1, wherein size of an allocated stack frame varies in accordance with size of the local data.

8. A method, comprising:
    receiving by a processor of a computing device at runtime a single instance of universally shared generic code that works for all possible data types of variables and/or objects in each instantiation of generic code;
    receiving a generic context parameter;
    executing the single instance of universally shared generic code, wherein the behavior of the single instance of universally shared generic code is determined by the generic context parameter received at runtime, the single instance of universally shared generic code storing local data on a stack during runtime instead of on a garbage collection (GC) heap; and
    generating precise garbage collection reporting information that indicates precisely where in the stack the local data is to be reclaimed.

9. The method of claim 8, further comprising:
    determining size of the stack based on a type description.

10. The method of claim 8, further comprising:
    receiving a generic context parameter comprising a type description for local data to be stored on the stack.

11. The method of claim 8, further comprising:
    receiving a generic context parameter at runtime from which stack size is dynamically determined.

12. A computing device comprising:
    at least one processor; and
    a memory connected to the at least one processor;
    wherein the at least one processor is configured to:
    receive generic source code;
    generate a single instance of universally shared generic code that works for all possible data types of variables and/or objects in each instantiation of the generic code from the generic source code;
    generate metadata for the universally shared generic code during compile time that is associated with field layouts and instance sizes of generic types in the generic source code; and
    utilize the metadata and a generic context parameter, at runtime, to determine a size for a stack frame of a stack to allocate local data of the universally shared generic code in the stack instead of a garbage collection heap.

13. The computing device of claim 12, wherein the at least one processor is further configured to:
    provide precise garbage collection (GC) reporting information to a subsequent process, wherein the precise GC reporting information indicates precisely where in memory the local data is to be reclaimed.

14. The computing device of claim 13, wherein the at least one processor is further configured to:
    at runtime keep track of where a particular piece of local data is stored on the stack.

15. The computing device of claim 14, wherein the at least one processor is further configured to:
    tell a garbage collector when the local data can be garbage collected.

16. The computing device of claim 15, wherein the at least one processor is further configured to:
    tell the garbage collector where on the stack the local data that can be reclaimed is found.

17. The computing device of claim 13, wherein each code segment of the generic source code is assigned a frame on the stack.

18. The computing device of claim 13, wherein the stack comprises a reporting area.

19. The computing device of claim 12, wherein the universally shared generic code is generated in response to receiving no parameter at compile time.

* * * * *